US009203679B2

(12) United States Patent
Chavali

(10) Patent No.: US 9,203,679 B2
(45) Date of Patent: Dec. 1, 2015

(54) LOW LATENCY OFDM SYSTEM

(71) Applicant: Uurmi Systems Private Limited, Hyderabad (IN)

(72) Inventor: Nanda Kishore Chavali, Hyderabad (IN)

(73) Assignee: INTERRA SYSTEMS, INC., Cupertino, CA (US)

( * ) Notice: Subject to any disclaimer, the term of this patent is extended or adjusted under 35 U.S.C. 154(b) by 190 days.

(21) Appl. No.: 13/899,807

(22) Filed: May 22, 2013

(65) Prior Publication Data

US 2014/0348267 A1 Nov. 27, 2014

(51) Int. Cl.
*H04K 1/10* (2006.01)
*H04L 27/28* (2006.01)
*H04L 27/26* (2006.01)

(52) U.S. Cl.
CPC .......... *H04L 27/2698* (2013.01); *H04L 27/263* (2013.01); *H04L 27/265* (2013.01); *H04L 27/2634* (2013.01)

(58) Field of Classification Search
CPC .............. H04L 27/2647; H04L 5/0007; H04L 27/2657; H04L 27/2662; H04L 5/0048; H04L 27/368; H04L 25/03343; H04L 27/2332; H04L 2027/003; H04L 27/38; H04L 27/14; H04L 25/067; H04L 1/0045; H04L 1/005; H04L 1/0054; H03F 1/3247; H03F 1/3294; H03F 2201/3233; H03D 3/007
USPC .................................................. 375/259–352
See application file for complete search history.

(56) References Cited

U.S. PATENT DOCUMENTS

| | | | | |
|---|---|---|---|---|
| 6,661,856 | B1* | 12/2003 | Calderbank et al. .......... | 375/347 |
| 7,539,259 | B2* | 5/2009 | Dias et al. ...................... | 375/267 |
| 7,561,511 | B1* | 7/2009 | Kumar et al. .................. | 370/208 |
| 2004/0120413 | A1* | 6/2004 | Park et al. ...................... | 375/260 |
| 2005/0117670 | A1* | 6/2005 | Webster et al. ................ | 375/330 |
| 2006/0008016 | A1* | 1/2006 | Balakrishnan et al. ........ | 375/260 |
| 2008/0025437 | A1* | 1/2008 | Huynh ........................... | 375/324 |
| 2008/0026717 | A1* | 1/2008 | Huynh ........................... | 455/266 |
| 2009/0092193 | A1* | 4/2009 | Fujita ............................. | 375/260 |
| 2009/0202007 | A1* | 8/2009 | Zielinski et al. ............... | 375/260 |
| 2009/0245406 | A1* | 10/2009 | Moffatt et al. ................. | 375/261 |
| 2010/0239046 | A1* | 9/2010 | Chun et al. ..................... | 375/295 |
| 2013/0121306 | A1* | 5/2013 | Murakami et al. ............. | 370/330 |
| 2014/0376418 | A1* | 12/2014 | Banerjea ........................ | 370/278 |

\* cited by examiner

*Primary Examiner* — James M Perez
(74) *Attorney, Agent, or Firm* — Balser & Grell IP Law

(57) ABSTRACT

A low latency transmitter and receiver for an OFDM system are disclosed. The low latency transmitter includes an FFT module and a baseband modulator. The FFT module computes IDFT of PSK constellation data symbols or QAM constellation data symbols. The baseband modulator performs complex modulation of the IDFT samples by multiplying these samples with 1 and −1 alternatively in time domain. The low latency receiver includes a baseband demodulator and another FFT module. The baseband demodulator performs complex demodulation of the received samples of OFDM symbols by multiplying the samples of OFDM symbols with 1 and −1 alternatively in time domain thereby obtaining baseband demodulated symbols. The FFT module of the receiver computes DFT of samples of the baseband demodulated symbols to obtain samples of the OFDM demodulated symbols.

20 Claims, 3 Drawing Sheets

LOW LATENCY OFDM SYSTEM

TECHNICAL FIELD

The presently disclosed embodiments generally relate to wireless communication. More particularly, the presently disclosed embodiments relate to a low latency OFDM transceiver having a low latency transmitter and a low latency receiver.

BACKGROUND

In the recent past, IEEE 802.11 wireless LAN (WLAN) has emerged as prevailing wireless technology throughout the world. The development of 802.11a introduced Orthogonal Frequency Division Multiplexing (OFDM) to 802.11. Subsequently, the 802.11 working group developed the 802.11g amendment, which incorporates the 802.11a OFDM PHY in the 2.4 GHz band. With the development of the IEEE 802.11n, data rate is increased to 300 Mbps in 20 MHz and 600 Mbps in 40 MHz bandwidth. The upcoming IEEE 802.11ac (Very High Throughput (VHT) standard) enhances the data rate beyond 1 Gbps in 5 GHz band.

These standards have used OFDM modulation as the transmission technique for high data rates. The OFDM is a method of transmitting digital data on multiple carrier frequencies. The carrier frequencies are chosen such that they are orthogonal to each other, meaning that cross-talk between the sub-channels is eliminated and inter-carrier guard bands are not required. This greatly simplifies the design of both transmitter and receiver. The orthogonality allows for efficient OFDM modulator and OFDM demodulator implementation using the Discrete Fourier Transform (DFT) algorithm on the receiver side, and Inverse DFT (IDFT) on the transmitter side. In OFDM systems, IDFT/DFT is implemented using a serial Fast Fourier Transform (FFT) algorithm for hardware simplicity, which takes input samples serially from 0th sample to $(N-1)^{th}$ samples.

Generally, the implementation of IFFT/FFT is such that it takes samples indexed from 0 to N−1 and provides outputs indexed from 0 to N−1. For IEEE 802.11 standards, in the IFFT equation, the samples are indexed from −N/2 to N/2−1 corresponding to the subcarriers −N/2 to N/2−1. To implement the IFFT, it is suggested in the standard that the samples corresponding to subcarriers indexed from −N/2 to N/2−1 are moved after the samples corresponding to subcarriers indexed from 0 to N/2−1 before sending them to the IFFT in the transmitter. At the receiver, the carriers are required to be remapped before processing by a soft constellation de-mapper. To perform these operations, buffering of samples corresponding to half OFDM symbol is required at both the transmitter and the receiver, which requires a huge amount of memory especially when N is large. It also adds a huge amount of latency in the transceiver path.

Thus, there exists a strong need of a low latency technique for transmission and processing of OFDM symbols.

SUMMARY

According to various embodiments illustrated herein, there is provided a low latency transmitter for an OFDM system. The low latency transmitter includes an FFT module and a baseband modulator. The FFT module is configured to compute IDFT of data symbols thereby obtaining inverse discrete Fourier transformed samples, wherein the data symbols correspond to Phase Shift Keying (PSK) constellation data symbols or Quadrature Amplitude Modulation (QAM) constellation data symbols. The baseband modulator is configured to perform complex modulation of the inverse discrete Fourier transformed samples of OFDM modulated symbols, wherein the complex modulation comprises multiplying the inverse discrete Fourier transformed samples by 1 and −1 alternatively in time domain, and wherein the multiplication by −1 corresponds to 2's complement operation, and wherein the baseband modulator is implemented using one or more NOT and/or XOR gates.

According to various embodiments illustrated herein, there is provided a low latency receiver for an OFDM system. The low latency receiver includes a baseband demodulator and an FFT module. The baseband demodulator is configured to perform complex demodulation of samples of OFDM symbols thereby obtaining samples of baseband demodulated symbols, wherein the complex demodulation comprises multiplying the samples of the OFDM symbols by 1 and −1 alternatively in time domain, and wherein the multiplication by −1 corresponds to 2's complement operation. The FFT module is configured to compute DFT of the samples of the baseband demodulated symbols thereby obtaining OFDM demodulated symbols.

According to various embodiments illustrated herein, there is provided a method for transmitting OFDM symbols. The method includes computing IDFT of data symbols thereby obtaining inverse discrete Fourier transformed samples. The data symbols correspond to PSK constellation data symbols or QAM constellation data symbols. The inverse discrete Fourier transformed samples are then modulated to obtain samples of baseband modulated symbols. The modulation is performed by multiplying the inverse discrete Fourier transformed samples by 1 and −1 alternatively in time domain using NOT and XOR gates. Thereafter, the baseband modulated symbols using one or more antennas after passing through an Analog Front End (AFE) and a Radio Frequency (RF) modulator.

According to various embodiments illustrated herein, there is provided a method for processing samples of OFDM symbols. The method includes receiving the samples of OFDM symbols using one or more receiving antennas in conjunction with an RF demodulator and an AFE. The received OFDM symbols are then demodulated to obtain baseband demodulated symbols. The demodulating comprises multiplying the samples of the received OFDM symbols by 1 and −1 alternatively in time domain using NOT and XOR gates. Thereafter, DFT of the samples of the demodulated symbols is computed to obtain OFDM demodulated symbols.

According to various embodiments illustrated herein, there is provided a computer program product for use with a computer. The computer program product comprising a non-transitory computer-readable medium embodied therein a computer program code for transmitting OFDM symbols. The computer program code includes program instruction means for: computing IDFT of data symbols thereby obtaining inverse discrete Fourier transformed samples, wherein the data symbols correspond to PSK constellation data symbols or QAM constellation data symbols; and modulating the inverse fast Fourier transformed samples thereby obtaining samples of baseband modulated symbols, wherein the modulating process comprises multiplying the inverse fast Fourier transformed samples by 1 and −1 alternatively in time domain.

According to various embodiments illustrated herein, there is provided a computer program product for use with a computer. The computer program product comprising a non-transitory computer-readable medium embodied therein a computer program code for processing samples of OFDM symbols. The computer program code comprising program instruction means for: receiving the samples of OFDM symbols; demodulating the received OFDM symbols thereby obtaining samples of baseband demodulated symbols, wherein the demodulating process comprises multiplying the samples of the received OFDM symbols by 1 and −1 alternatively in time domain; and computing Discrete Fourier transform of the baseband demodulated symbols thereby obtaining OFDM demodulated symbols.

BRIEF DESCRIPTION OF DRAWINGS

One or more embodiments are set forth in the drawings and in the following description. The appended claims particularly and distinctly point out and set forth the invention.

The accompanying drawings, which are incorporated in and constitute a part of the patent application, illustrate various embodiments of various aspects of the ongoing description. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Figure 1:
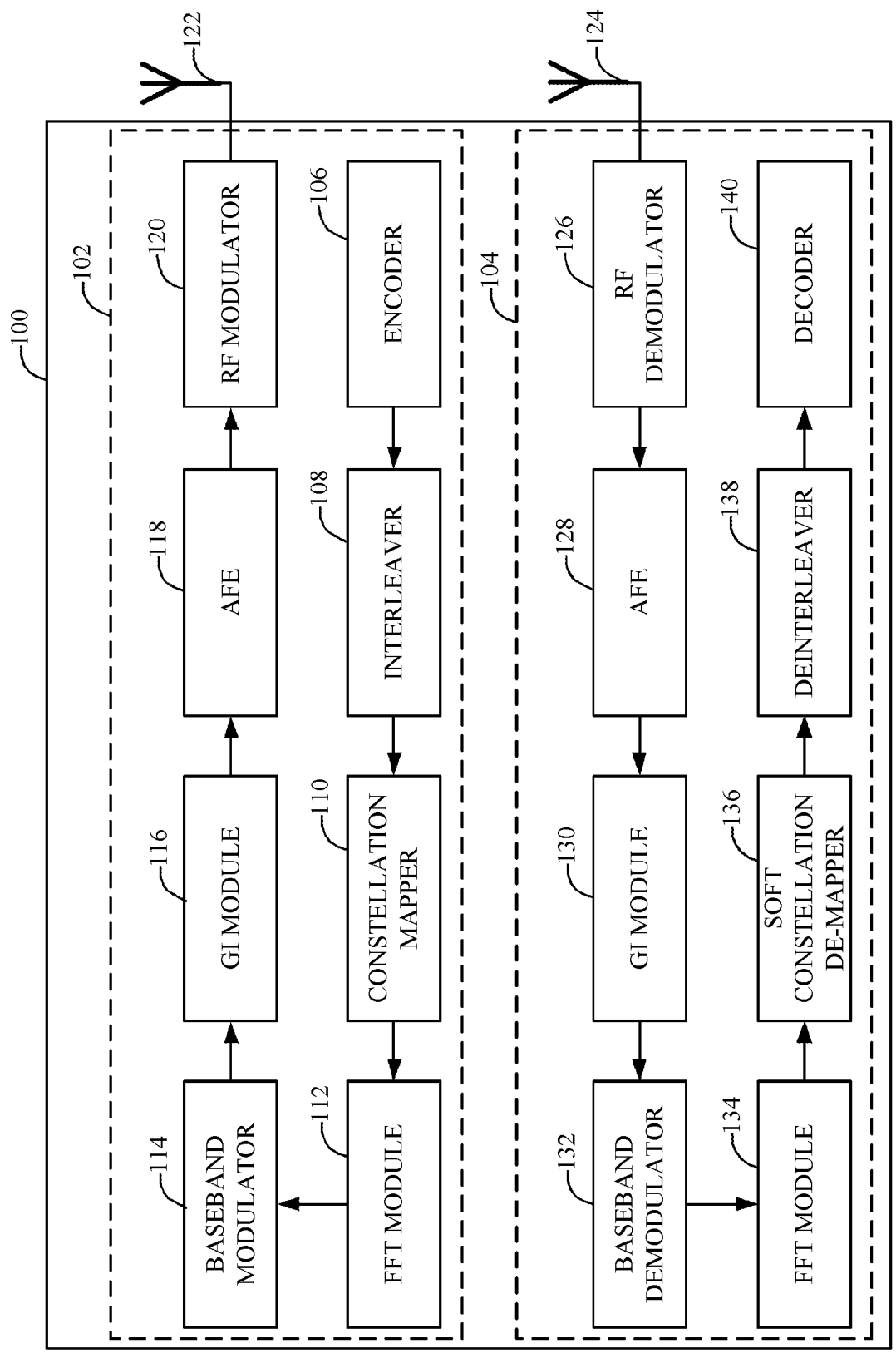
FIG. 1 is a block diagram illustrating a low latency transceiver in accordance with various embodiments.

FIG. 1 is a block diagram illustrating a low latency transceiver 100 in accordance with various embodiments. The low latency transceiver 100 is compliant with the IEEE 802.11 standards. The low latency transceiver 100 is capable of transmitting and processing OFDM data symbols.

The low latency transceiver 100 includes a low latency transmitter 102 and a low latency receiver 104. The low latency transmitter 102 includes an encoder 106, an interleaver 108, a constellation mapper 110, an FFT module 112, a baseband modulator 114, a Guard Interval (GI) module 116, an AFE 118, an RF modulator 120, and a transmitting antenna 122. The low latency receiver 104 includes a receiving antenna 124, an RF demodulator 126, an AFE 128, a GI module 130, a baseband demodulator 132, an FFT module 134, a soft constellation de-mapper 136, a deinterleaver 138, and a decoder 140.

The encoder 106 receives information data bits and performs Forward Error Correction (FEC) coding to generate encoded data. Thus, by applying the FEC coding, errors in the data transmission over a noisy or unreliable channel can be minimized. The encoder can be implemented using suitable hardware circuits using shift registers and XOR gates. In an alternate embodiment, the FEC coding can be facilitated using block encoding or convolution encoding techniques at the encoder 106 and corresponding decoding can be facilitated by implementing hard-decision algorithms or soft-decision decoder algorithms at the decoder 140. The hard-decision algorithms and soft-decision algorithms are executed by a processor (not shown) in the low latency transceiver 100. The processor can be realized as for example, microprocessor (RISC or CISC) or a microcontroller.

The interleaver 108 interleaves the encoded data to obtain interleaved data. The constellation mapper 110 receives the interleaved data and converts it into QAM/PSK sub-symbols (hereinafter referred to as data symbols). In most cases, few pilot sub-symbols are also multiplexed along with data symbols. Pilot sub-symbols are known at the low latency receiver 104 and are used in the estimation of phase noise and channel tracking. The details of the interleaving and constellation mapping is covered in the IEEE Std 802.11a-1999 (R2003), which is herein incorporated by reference in its entirety, and hence not discussed in great details in the ongoing description.

The FFT module 112 computes IDFT of the samples of the data symbols (hereinafter referred to as "inverse discrete Fourier transformed data symbols" OR "IDFT data symbols") to be transmitted with no buffering of samples.

In conventional approach, as disclosed in IEEE Std 802.11a-1999 (R2003), IDFT of a frequency domain data symbols $X_k$, is computed as $$x(t) = \frac{1}{\sqrt{N_{SF}}} \sum_{k=-\frac{N}{2}}^{\frac{N}{2}-1} X_k \exp(j2\pi\Delta f(t - T_g)) \qquad (1)$$

Where $X_k$ is PSK/QAM mapped complex sub-symbol, $\Delta f$ is sub-carrier spacing in Hz, $T_g$ is the GI in seconds and $N_{SF}$ is a scale factor. The data symbols have to be appropriately mapped such that required OFDM modulation is achieved. The digital low pass equivalent signal corresponding to x(t) excluding the GI, is given by $$x(n) = \frac{1}{\sqrt{N_{SF}}} \sum_{k=-\frac{N}{2}}^{\frac{N}{2}-1} X_k \exp\left(j\frac{2\pi}{N}nk\right) \qquad (2)$$

Where,
n=Index of time domain samples
k=Index of frequency domain samples
N=Total number of subcarriers used or Size of DFT
$N_{SF}$=Scaling factor, ensures that the total power of the time domain signal is equal to that of frequency domain data symbol $X_k$ $X_k$=data symbols corresponding to subcarriers indexed from $$-\frac{N}{2} \text{ to } \frac{N}{2}-1$$

If, an N-point IFFT is used for OFDM modulation, the coefficients 1 to N/2 are mapped to the same numbered IFFT inputs, while the coefficients −N/2 to −1 are copied into IFFT inputs N/2 to N−1. Thus, the samples corresponding to the first half of the OFDM symbol are needed to be buffered both at transmitter and receiver.

The present low latency transmitter 102 generates the OFDM modulated data symbols while avoiding the need of mapping of data symbols and subsequent buffering of samples corresponding to half of the OFDM symbol. This is achieved by implementing the FFT module 112 and the baseband modulator 114 as described infra.

Substituting k by $$k' = k + \frac{N}{2}$$

in equation (2):

$$x(n) = \frac{1}{\sqrt{N_{SF}}} \sum_{k'=0}^{N-1} X_{k'} \exp\left(j\frac{2\pi}{N}n\left(k' - \frac{N}{2}\right)\right) \quad (3)$$

After simplifying the equation (3) and changing the dummy variable k', $$x(n) = \frac{1}{\sqrt{N_{SF}}} e^{-j2\Pi n(N/2)/N} \sum_{k=0}^{N-1} X_k \exp\left(j\frac{2\pi}{N}nk\right) \quad (4)$$

From the exponential term outside the summation of the equation (4), it can be observed that the effect of mapping the subcarriers is equivalent to the complex modulation of analog passband signal with frequency $$\frac{N\Delta f}{2}.$$

Equation (4) can be further simplified for implementation convenience as:

$$x(n) = e^{-j\pi n} * x'(n) \quad (5)$$

or $$x(n) = (-1)^n * x'(n)$$

where $$x'(n) = \frac{1}{\sqrt{N_{SF}}} \sum_{k=0}^{N-1} X_k \exp\left(j\frac{2\pi}{N}nk\right) \quad (6)$$

is the IDFT of the frequency domain data symbols without subcarrier mapping.

Therefore, effect of direct mapping (as required by the conventional method) can be negated by complex modulation i.e. by multiplying the time domain samples with $e^{-j\pi n}$. Whenever 'n' is even, it is 1 and when 'n' is odd, it is −1. Hence, this can be implemented by multiplying the inverse discrete Fourier transformed time domain samples (with no buffering) with 1 and −1 alternatively by the baseband modulator 114. The multiplication by −1 corresponds to performing the 2's complement operation. In an embodiment, the 2's complement operation can be implemented using a suitable arrangement of logic gates like one or more AND and XOR gates.

After performing the baseband modulation operation, the resulted samples of OFDM modulated symbol (i.e., the output of the baseband modulator 114) are passed to the GI module 116. The GI module 116 inserts a GI ($T_g$) as shown in the equation (1). The detail of the insertion of the GI is disclosed in the IEEE Std 802.11a-1999 (R2003). Thereafter, the data symbols are processed by the AFE 118 for performing digital to analog conversion of the OFDM modulated data symbols with the GI. The AFE 118 is implemented using the state of the art Digital to Analog converters (DAC). Thereafter the analog signal is passed through the RF modulator 120 to apply the RF modulation. The RF modulated signal is then transmitted by the transmitting antenna 122. It is to be appreciated by a person having ordinary skill in the art that the ongoing description is not limited with respect to the type of modulation performed by the RF modulator 120 and the type of transmitting antenna 122.

The low latency receiver 104 is capable of processing IEEE 802.11 compliant signals (e.g., received from a transceiver/transmitter compliant with IEEE 802.11 using OFDM technique) received using the receiving antenna 124.

The RF demodulator 126 demodulates the received analog RF signal by applying suitable RF demodulation techniques. Thereafter, the demodulated signal (in analog form) is processed by the AFE 128 to convert into digital form. Thereafter, the GI module 130 removes the GI inserted at the transmitter. These operations are disclosed in the IEEE Std 802.11a-1999 (R2003).

After the removal of the GI, the baseband demodulator 132 performs complex demodulation of the data symbols received from the GI module 130. The complex demodulation is implemented by multiplying the samples of the received OFDM symbols by 1 and −1 alternatively using suitable arrangement of one or more AND and XOR logic gates. Thus, samples of baseband demodulated symbols are obtained.

Whereas in the conventional approach (as disclosed in the IEEE Std 802.11a-1999 (R2003)), at the receiver, to provide the proper output to the next unit i.e., from −N/2 to N/2−1, buffering of N/2 samples is required, which also adds latency. This is now not required due to the complex demodulation performed by the baseband demodulator 132.

The FFT module 134 receives the samples of the baseband demodulated symbols and computes the DFT of the samples of the baseband demodulated symbols by applying FFT algorithm. The DFT of the samples of the baseband demodulated symbols represents OFDM demodulated data symbols.

The soft constellation de-mapper 136 converts the OFDM demodulated data symbols into soft data bits. The deinterleaver 138 coupled to the soft constellation de-mapper 136 deinterleaves the soft data bits thereby obtaining a deinterleaved soft bit stream by applying deinterleaving operation. Thereafter, the decoder 140 decodes the soft bit stream by applying FEC decoding techniques.

The FFT modules 112 and 134 are implemented using state of the art IFFT/FFT processors. As disclosed above, the baseband modulator 114 and baseband demodulator 132 are implemented using either 2's complement algorithm (executed by the processor) or using suitable arrangement of AND and XOR gates. The remaining components of the low latency transceiver are implemented using suitable techniques known in the art, functionalities of which are described in the IEEE Std 802.11a-1999 (R2003), which is herein incorporated by reference in its entirety, and hence not discussed in great detail in the ongoing description.

Although the low latency transmitter 102 and the low latency receiver 104 are shown as a part of the low latency transceiver 100, they can also be implemented separately without deviating from the scope of the ongoing description.

Figure 2:
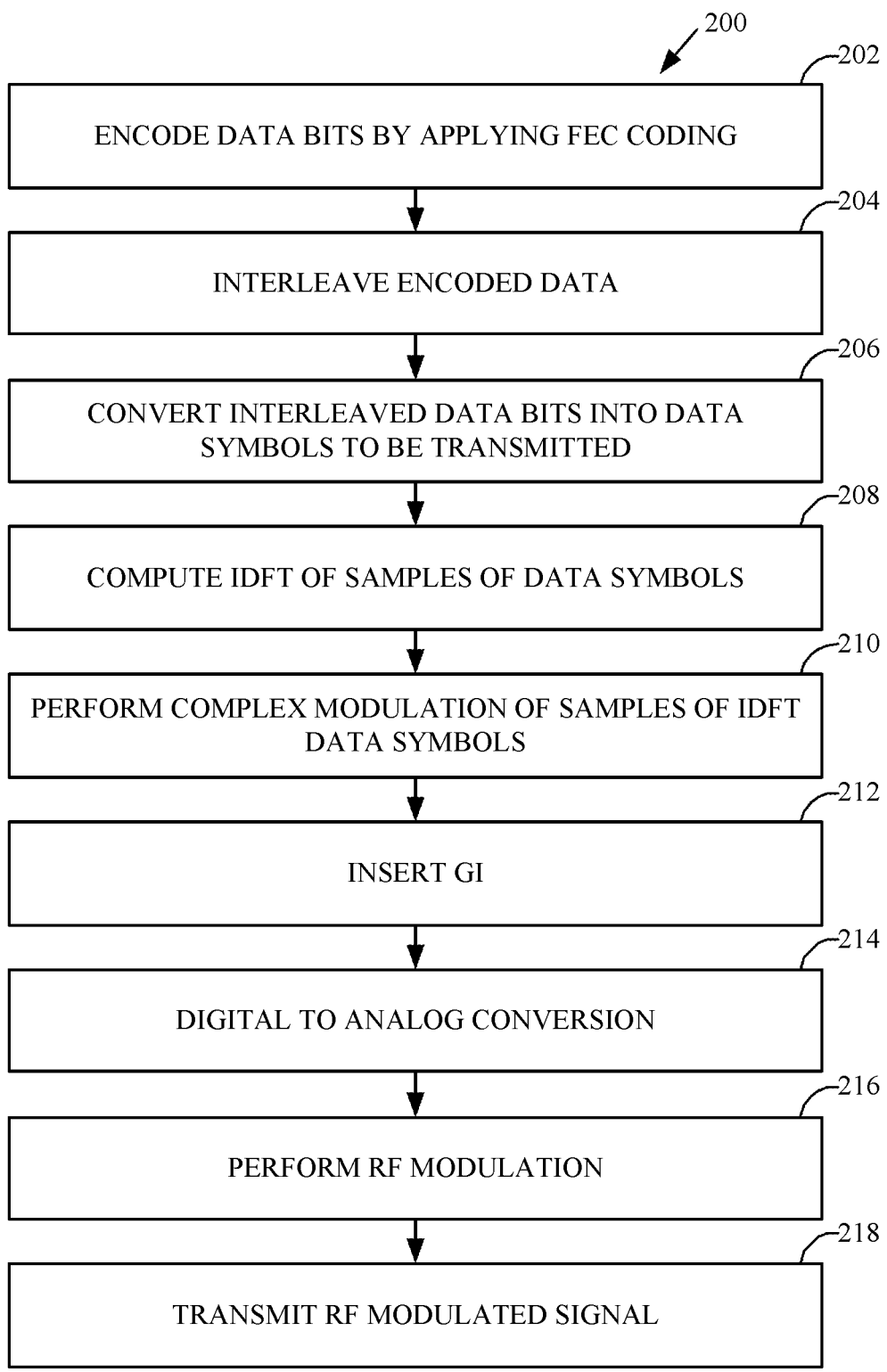
FIG. 2 is a flow diagram illustrating a method for transmitting OFDM symbols in accordance with various embodiments.

FIG. 2 is a flow diagram 200 illustrating a method for transmitting OFDM symbols in accordance with various embodiments.

At step 202, the encoder 106 encodes the data bits (information data) by applying FEC coding to obtain encoded data. At step 204, the encoded data is interleaved by the interleaver 108 to obtain the interleaved data bits. At step 206, the interleaved data bits are converted by the constellation mapper 110 into the data symbols to be transmitted. At step 208, IDFT of samples of the data symbols to be transmitted is computed by the FFT module 112. Thus, inverse discrete Fourier transformed samples (IDFT samples) are obtained. At step 210, complex modulation of the IDFT samples is performed by the baseband modulator 114 to obtain the samples of baseband modulated data symbols, which are equivalent to samples of OFDM modulated data symbols. The complex modulation is performed by multiplying the IDFT samples by 1 and −1 alternatively by the baseband modulator 114. At step 212, the GI is inserted between each of the baseband modulated data symbols by the GI module 116. At step 214, the samples of baseband modulated symbols (with the GI between each symbol) are converted into an analog signal by the AFE 118. At step 216, the analog signal thus generated by the AFE 118 is RF modulated by the RF modulator 120. At step 218, the RF modulated signal is transmitted by the transmitting antenna 122.

Figure 3:
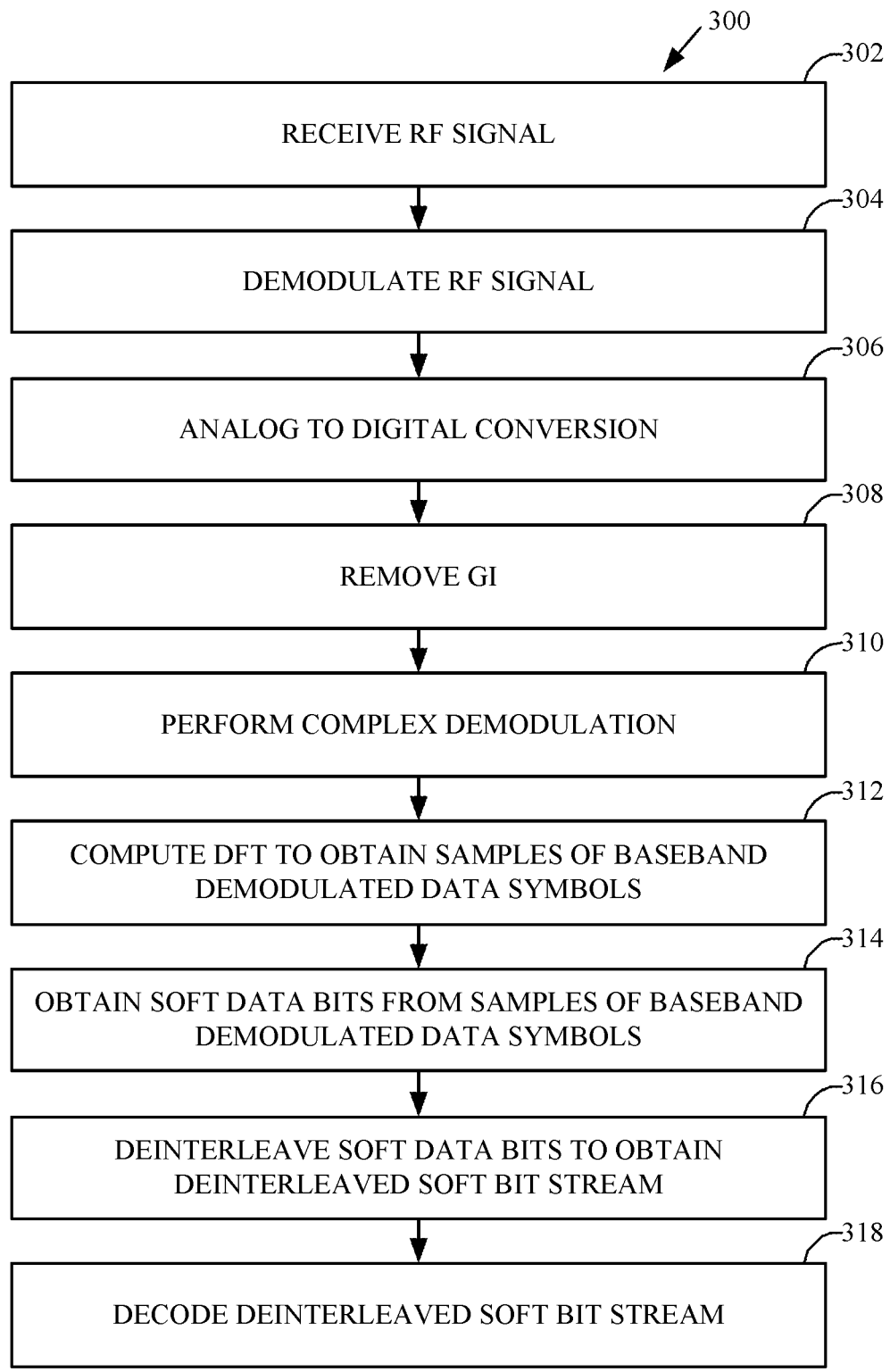
FIG. 3 is a flow diagram illustrating a method for processing OFDM symbols in accordance with various embodiments.

FIG. 3 is a flow diagram 300 illustrating a method for processing OFDM symbols in accordance with various embodiments.

At step 302, an RF signal is received by the receiving antenna 124. The RF signal contains the information of OFDM modulated data symbols. At step 304, the received RF signal is demodulated using RF demodulator 126. At step 306, the demodulated RF signal is converted into digital signal (a sequence of OFDM symbols) by the AFE 128. Here, OFDM symbols and OFDM modulated symbols are same and interchangeably used. At step 308, the GI between each of the OFDM symbols is removed by the GI module 130. At step 310, complex demodulation of the samples of the OFDM symbols is performed by the baseband demodulator 132 to obtain samples of the baseband demodulated data symbols. The complex demodulation is performed by multiplying the samples of the OFDM data symbols by 1 and −1 alternatively by the baseband demodulator 132. At step 312, DFT of the samples of the baseband demodulated symbols is computed by the FFT module 134 by applying FFT algorithm to obtain the OFDM demodulated symbols. At step 314, soft data bits are obtained by the soft constellation de-mapper 136 by processing the samples of the OFDM demodulated symbols. At step 316, the soft data bits are deinterleaved by the deinterleaver 138 to obtain soft bit stream. At step 318, the soft bit stream is decoded by the decoder 140 to obtain actual information data.

Embodiments of the present invention may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the computer-readable medium or by copying the code from the computer-readable medium into another computer-readable medium (e.g., a hard disk, RAM, etc.) or by transmitting the code on a network for remote execution. Various methods described herein may be practiced by combining one or more computer-readable media containing the code according to the present invention with appropriate standard computer hardware to execute the code contained therein. An apparatus for practicing various embodiments of the present invention may involve one or more computers (or one or more processors within a single computer, or one or more processor cores) and storage systems containing or having network access to computer program(s) coded in accordance with various methods described herein, and the method steps of the invention could be accomplished by modules, routines, subroutines, or subparts of a computer program product.

While for purposes of simplicity of explanation, the illustrated methodologies are shown and described as a series of blocks/steps, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Various embodiments of the low latency transceiver/low latency transmitter and low latency receiver have been disclosed. It should be apparent, however, to those skilled in the art that many more modifications besides those already described are possible without departing from the inventive concepts herein. The embodiments, therefore, are not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

In the foregoing description, certain terms have been used for brevity, clearness, and understanding. No unnecessary limitations are to be implied there from beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

The invention claimed is:

1. A low latency transmitter for an Orthogonal Frequency Division Multiplexed (OFDM) system, the low latency transmitter comprising:
    an Inverse Fourier Transformation module configured to compute an Inverse Discrete Fourier Transform (IDFT) of data symbols thereby obtaining Inverse Discrete Fourier Transformed samples, the data symbols correspond to Phase Shift Keying (PSK) constellation data symbols or Quadrature Amplitude Modulation (QAM) constellation data symbols;
    a baseband modulator configured to perform complex modulation of the Inverse Discrete Fourier Transformed samples thereby obtaining OFDM modulated symbols, the complex modulation comprises multiplying the Inverse Discrete Fourier Transformed samples by 1 and −1 alternatively in the time domain using at least one AND gate and at least one XOR gate, and the multiplication by −1 corresponds to a 2's complement operation; and
    one or more transmitting antennas for transmitting a Radio Frequency (RF) modulated signal containing the OFDM modulated symbols.

2. The low latency transmitter of the claim 1, further comprising an encoder to perform Forward Error Correction (FEC) coding of data bits to output encoded data.

3. The low latency transmitter of the claim 2, further comprising an interleaver to interleave the encoded data to obtain interleaved data.

4. The low latency transmitter of claim 3, further comprising a constellation mapper to convert the interleaved data into the data symbols.

5. The low latency transmitter of claim 1, further comprising a Guard Interval (GI) module configured to insert a GI between each of the OFDM modulated symbols.

6. The low latency transmitter of the claim 5, further comprising an Analog Front End (AFE) to process the OFDM modulated symbols after insertion of the GI to obtain an analog signal, wherein the AFE comprises a Digital to Analog (DAC) converter.

7. The low latency transmitter of the claim 6, further comprising a Radio Frequency (RF) modulator coupled to the AFE to modulate the analog signal in order to obtain the RF modulated signal.

8. The low latency transmitter of the claim 7, wherein the RF modulator is coupled to the one or more transmitting antennas.

9. A low latency receiver for an Orthogonal Frequency Division Multiplexed (OFDM) system, the low latency receiver comprising:
    one or more receiving antennas for receiving a Radio Frequency (RF) signal containing OFDM symbols;
    a baseband demodulator configured to perform complex demodulation of samples of the received OFDM symbols thereby obtaining baseband demodulated OFDM symbols, the complex demodulation comprises multiplying the samples of the received OFDM symbols by 1 and −1 alternatively in a time domain, and the multiplication by −1 corresponds to a 2's complement operation; and
    a Fourier Transformation module configured to compute a Discrete Fourier Transform (DFT) of the baseband demodulated OFDM symbols thereby obtaining OFDM demodulated symbols, the OFDM demodulated symbols each include Phase Shift Keying (PSK) constellation data symbols or Quadrature Amplitude Modulation (QAM) constellation data symbols.

10. The low latency receiver of claim 9, further comprising an RF demodulator coupled to the one or more receiving antennas to demodulate the received RF signal thereby obtaining an RF demodulated signal.

11. The low latency receiver of claim 10, further comprising an Analog Front End (AFE) coupled to the RF demodulator for processing the RF demodulated signal to obtain the samples of the received OFDM symbols, wherein the AFE comprises an Analog to Digital Converter (ADC).

12. The low latency receiver of claim 11, further comprising a Guard Interval (GI) module configured to remove any GI between each of the OFDM symbols, wherein the GI module is functionally before the baseband demodulator.

13. The low latency receiver of claim 9, further comprising a soft constellation de-mapper to convert the OFDM demodulated symbols into soft data bits.

14. The low latency receiver of claim 13, further comprising a de-interleaver to perform a deinterleaving operation on the soft data bits thereby obtaining a deinterleaved soft bit stream.

15. The low latency receiver of claim 14, further comprising a decoder to perform Forward Error Correction (FEC) decoding of the deinterleaved soft bit stream to correct errors and to obtain actual information data.

16. The low latency receiver of claim 9, wherein the baseband demodulator is implemented using at least one AND gate and at least one XOR gate.

17. A method for transmitting Orthogonal Frequency Division Multiplexed (OFDM) symbols, the method comprising:
    computing an Inverse Discrete Fourier Transform (IDFT) of data symbols thereby obtaining Inverse Discrete Fourier Transformed samples, the data symbols correspond to Phase Shift Keying (PSK) constellation data symbols or Quadrature Amplitude Modulation (QAM) constellation data symbols;
    modulating, with a baseband modulator, the Inverse Discrete Fourier Transformed samples thereby obtaining OFDM modulated symbols, the modulating process comprises multiplying the Inverse Discrete Fourier Transformed samples by 1 and −1 alternatively in the time domain using at least one AND gate and at least one XOR gate, the multiplication by −1 corresponds to a 2's complement operation; and
    transmitting a Radio Frequency (RF) modulated signal containing the OFDM modulated symbols using one or more transmitting antennas after the OFDM modulated symbols have passed through an Analog Front End (AFE) and an RF modulator.

18. A method for processing Orthogonal Frequency Division Multiplexed (OFDM) symbols, the method comprising:
    receiving a Radio Frequency (RF) signal containing OFDM symbols using one or more receiving antennas that outputs to an RF demodulator and then to an Analog to Digital Converter (ADC);
    demodulating, with a baseband demodulator, samples of the received OFDM symbols output by the ADC thereby obtaining baseband demodulated OFDM symbols, the demodulating process comprises multiplying the samples of the received OFDM symbols by 1 and −1 alternatively in a time domain using at least one AND gate and at least one XOR gate, the multiplication by −1 corresponds to a 2's complement operation; and computing a Discrete Fourier Transform (DFT) of the baseband demodulated OFDM symbols thereby obtaining OFDM demodulated symbols, the OFDM demodulated symbols each include Phase Shift Keying (PSK) constellation data symbols or Quadrature Amplitude Modulation (QAM) constellation data symbols.

19. A computer program product used by a transmitter, the computer program product comprising a non-transitory computer-readable medium embodied therein a computer program code for transmitting Orthogonal Frequency Division Multiplexed (OFDM) symbols, the computer program code programs the transmitter to be configured to:

compute an Inverse Discrete Fourier Transform of data symbols thereby obtaining Inverse Discrete Fourier Transformed samples, the data symbols correspond to Phase Shift Keying (PSK) constellation data symbols or Quadrature Amplitude Modulation (QAM) constellation data symbols;

baseband modulate the Inverse Discrete Fourier Transformed samples thereby obtaining baseband modulated OFDM symbols, the baseband modulation comprises multiplying the Inverse Discrete Fourier Transformed samples by 1 and −1 alternatively in the time domain using at least one AND gate and at least one XOR gate, the multiplication by −1 corresponds to a 2's complement operation; and transmit a Radio Frequency (RF) modulated signal containing the OFDM modulated symbols using one or more transmitting antennas.

20. A computer program product used by a receiver, the computer program product comprising a non-transitory computer-readable medium embodied therein a computer program code for processing Orthogonal Frequency Division Multiplexed (OFDM) symbols, the computer program code programs the receiver to be configured to:

receive using one or more receiving antennas a Radio Frequency (RF) signal containing the OFDM symbols;

baseband demodulate samples of the received OFDM symbols output from an Analog to Digital Converter (ADC) thereby obtaining baseband demodulated OFDM symbols, the baseband demodulation comprises multiplying the samples of the received OFDM symbols by 1 and −1 alternatively in a time domain using at least one AND gate and at least one XOR gate, the multiplication by −1 corresponds to a 2's complement operation; and compute a Discrete Fourier Transform of the baseband demodulated OFDM symbols thereby obtaining OFDM demodulated symbols, the OFDM demodulated symbols each include Phase Shift Keying (PSK) constellation data symbols or Quadrature Amplitude Modulation (QAM) constellation data symbols.

* * * * *

UNITED STATES PATENT AND TRADEMARK OFFICE
CERTIFICATE OF CORRECTION

PATENT NO. : 9,203,679 B2
APPLICATION NO. : 13/899807
DATED : December 1, 2015
INVENTOR(S) : Nanda Kishore Chavali Page 1 of 1

It is certified that error appears in the above-identified patent and that said Letters Patent is hereby corrected as shown below:

On the title page item (73) should read: Uurmi Systems Private Limited, India

Signed and Sealed this
Twenty-eighth Day of June, 2016

Michelle K. Lee
*Director of the United States Patent and Trademark Office*